United States Patent [19]

Bollinger

[11] Patent Number: 4,643,868

[45] Date of Patent: Feb. 17, 1987

[54] SUPPORT ARRANGEMENT FOR CORE MODULES OF NUCLEAR REACTORS

[75] Inventor: Lawrence R. Bollinger, Schenectady, N.Y.

[73] Assignee: The United States of America as represented by the United States Department of Energy, Washington, D.C.

[21] Appl. No.: 548,279

[22] Filed: Nov. 3, 1983

[51] Int. Cl.[4] ............................................. G21C 19/00
[52] U.S. Cl. ................... 376/262; 376/268; 376/363; 294/906
[58] Field of Search ............... 376/261, 262, 268, 270, 376/271, 363; 294/906; 403/342, 343

[56] References Cited

U.S. PATENT DOCUMENTS

| | | | |
|---|---|---|---|
| 2,815,231 | 12/1957 | Wilson | 403/342 |
| 3,163,585 | 12/1964 | Metcalfe et al. | 376/363 |
| 3,239,245 | 3/1966 | Press et al. | 403/342 X |
| 3,604,746 | 9/1971 | Notari | 294/90 |
| 3,857,599 | 12/1974 | Jones et al. | 294/90 |
| 3,905,634 | 9/1975 | Johnson et al. | 376/233 X |
| 4,030,973 | 6/1977 | Hoffmeister et al. | 376/262 |
| 4,038,133 | 7/1977 | Bittermann et al. | 376/363 |
| 4,134,789 | 1/1979 | Aubert | 376/233 X |
| 4,279,699 | 7/1981 | Kuhn | 376/268 |

FOREIGN PATENT DOCUMENTS 2245234 4/1975 France ................................. 403/342
1425919 2/1976 United Kingdom ................ 294/906

Primary Examiner—Paul A. Bell
Attorney, Agent, or Firm—Judson R. Hightower; Richard E. Constant

[57] ABSTRACT

A support arrangement is provided for the core modules of a nuclear reactor which provides support access through the control drive mechanisms of the reactor. This arrangement provides axial support of individual reactor core modules from the pressure vessel head in a manner which permits attachment and detachment of the modules from the head to be accomplished through the control drive mechanisms after their leadscrews have been removed. The arrangement includes a module support nut which is suspended from the pressure vessel head and screw threaded to the shroud housing for the module. A spline lock prevents loosening of the screw connection. An installation tool assembly, including a cell lifting and preloading tool and a torquing tool, fits through the control drive mechanism and provides lifting of the shroud housing while disconnecting the spline lock, as well as application of torque to the module support nut.

15 Claims, 3 Drawing Figures

SUPPORT ARRANGEMENT FOR CORE MODULES OF NUCLEAR REACTORS

TECHNICAL FIELD

This invention relates to pressurized water reactors and in particular, to improved module support apparatus for the core modules of such reactors.

BACKGROUND ART

Most commercial pressurized water reactors (PWRs) have core modules which are axially supported at the bottom by a core support plate and are held down at the top by springs. Thus, the modules are subjected to column-type compression loading. Since it is desired that the fuel assemblies contain a minimum of structural material in order to minimize parasitic neutron absorption and maximize fuel content, such modules are relatively weak and tend to buckle under this column loading. The resulting distortion has been the cause of difficulties during refueling wherein a distorted module has interfered with removal of an adjacent module. Other potential difficulties include lack of straightness of control rod guide tubes and the resultant interference with control rod travel.

In designing a light water breeder reactor based upon PWR technology, the problem of module column loading has been exacerbated by special requirements of the breeder core design. The amount of structural material in the fuel assembly has had to be further reduced in order to enhance the neutron economy required to achieve breeding. The low water fraction necessitated by breeding considerations causes a high core flow resistance, thereby requiring higher compression holddown spring forces to resist the resulting high upward pressure forces. Thus, with previous constructions, column loading increased while the structure designed to carry this loading became weaker.

In some nuclear reactors the core is supported by the pressure vessel head. Examples include the original core and present breeder core installed in the Shippingport reactor. These reactors have required removal of their control drive mechanisms (CDMs) for access to the modle support hardware and the disconnecting of all module supports prior to removal of the reactor vessel head. Relatively large pressure vessel head penetrations have been required to accommodate this support hardware.

In typical commercial PWRs the fuel modules are arranged in a parallel array, with relatively small pressure vessel head penetrations through which the CDM leadscrews pass. There are on the order of one hundred CDMs in such installations. The removal of so many CDMs for access to core suspension hardware is excessively time consuming, and the small leadscrew penetrations in the head could not accommodate this hardware. In this regard, it is noted that in a typical commercial PWR the CDMs remain installed on the pressure vessel head when the head is removed for refueling and the tops of the CDM pressure housings are removed for the access required to disconnect and remove the leadscrews prior to head removal.

As mentioned above and discussed in detail below, the present invention relates to a module support arrangement, and patents of possible interest in this regard include U.S. Pat. Nos. 3,163,585 (Metcalf et al); 3,604,746 (Notari); 3,857,599 (Jones et al); 3,905,634 (Johnson et al); 4,030,973 (Hoffmeister et al); 4,038,133 (Bitterman et al); and 4,279,699 (Kuhn). These patents relate to various forms of gripper, latching and support devices and arrangements for nuclear reactor components.

SUMMARY OF THE INVENTION

In accordance with the invention, a fuel cell module support arrangement is provided which possesses a number of significant advantages over prior art support arrangements and, in particular, over conventional PWR module mounting arrangements. As will become evident from the discussions below, these advantages include a reduction in the amount of metal required in the fuel assembly, and the attendant improvement in neutron economy and higher core power and/or lifetime resulting therefrom. Additionally, there is less fuel assembly distortion, resulting in freer movement of the control rod and more reliable refueling. Further, the CDMs do not have to be removed to gain access to the module suspension hardware and the head thickness can be greatly reduced because of the small head penetrations necessary. In this latter regard, the support arrangement of the invention provides for axial support of the individual core modules from the pressure vessel head and permits attachment and detachment of the core modules from the head through the control drive mechanisms after the leadscrews are removed.

According to a preferred embodiment thereof, the arrangement comprises a module support nut, engaged with the pressure vessel head and supported therefrom, including a downwardly depending screw threaded portion, and a shroud housing for the fuel cell module including a screw threaded portion engaged with the screw threaded portion of the support nut such that the shroud housing is suspended from the support nut and thus from the pressure vessel head, the module support nut and the shroud housing including locking means for, when engaged, locking the nut and housing against relative rotation so as to prevent loosening of the nut during operation. The locking means preferably comprises a spring mounted lock member which is associated with the shroud housing and which is normally biased into engagement with a spline lock member of the support nut to provide locking of the support nut.

In accordance with a further important aspect of the invention, an installation tool assembly is provided which is adapted to be inserted through the bore in the control drive mechanism for the fuel cell module and into the bore of the shroud housing. This installation tool assembly includes a lifting and preloading tool for, when actuated, engaging and lifting the shroud housing and a concentrically mounted torquing tool for, when actuated, engaging the cell support nut and applying torque thereto. Preferably, the lifting and preloading tool includes an expandable gripping portion for, when expanded, gripping the shroud housing, and a central rod member for controlling expansion of the expandable gripping portion. Advantageously, the shroud housing includes an inwardly extending flange and the gripping portion includes an upwardly facing support surface which, in the use of said lifting and preloading tool, engages a downwardly facing surface of the flange. The lifting and preloading tool includes an elongate lifting member which includes the gripping portion referred to above and a hydraulic means is provided for controlling longitudinal movement of the lifting member. Preferably, this hydraulic means includes a hydraulic piston formed integrally with the lifting member.

The torquing tool preferably includes expandable gripping means for, when expanded, gripping the module support nut and means for applying a torque to the gripping means. Advantageously, the elongate lifting member of the lifting and preloading tool is positioned concentrically within the expandable gripping means of the torquing tool and includes means for expanding this expandable gripping means. The latter preferably comprises an expandable sleeve, and the torque applying means comprises a handle connected to the upper end of the sleeve. A spacer nut is preferably provided which is concentric with the sleeve and in abutment with the upper end thereof, and controls longitudinal movement of the expandable sleeve of the torquing tool. The means for expanding the expandable gripping means comprises an enlarged portion of the elongate lifting member located intermediate the ends thereof and the module support nut includes an inwardly extending spline portion for engagement by this expandable gripping means.

As noted above, the module support nut and the shroud housing preferably include spline locking means for, when engaged, locking the support nut and housing against relative rotation. In a preferred embodiment, the gripping portion of the lifting and preloading tool, when engaged with the shroud housing, provides disengagement of this spline locking means. Advantageously, the spline locking means includes, as noted above, a spring loaded spline locking member, and in this preferred embodiment, the shroud housing includes a bolt member which is positioned to be engaged by the gripping portion of the lifting and preloading tool and which, when engaged by the gripping portion, contacts the spring loaded spline locking member and causes disengagement thereof from the module support nut.

Other features and advantages of the invention will be set forth in, or apparent from, the detailed description of the preferred embodiments which follows.

DESCRIPTION OF THE PREFERRED EMBODIMENTS

Figure 1:
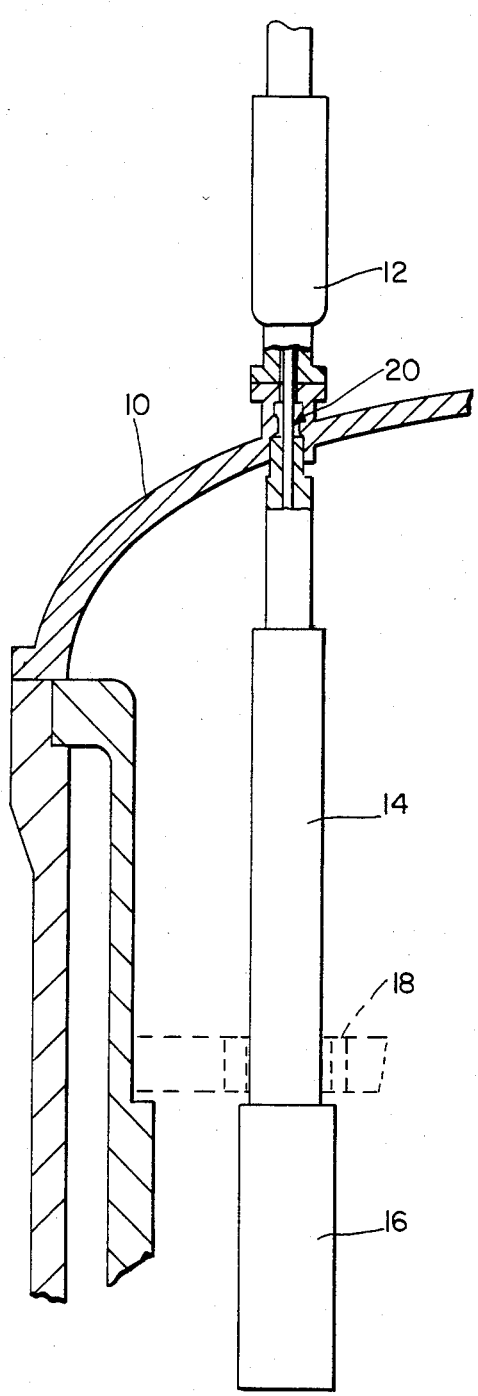
FIG. 1 is a schematic cross sectional view of a nuclear reactor incorporating the support arrangement of the invention.

Referring to FIG. 1, a portion of the reactor core is shown which includes a pressure vessel head 10, a control drive mechanism (CDM) 12, a shroud 14, and a fuel assembly 16. A grid plate is indicated in dashed lines at 18. These components are, of course, conventional and the purpose of FIG. 1 is to illustrate the location of the module support arrangement of the invention, which is generally denoted 20, in relation to these components. As illustrated, the support arrangement 20 penetrates vessel head 10 and extends between CDM 12 and shroud 14.

Figure 2:
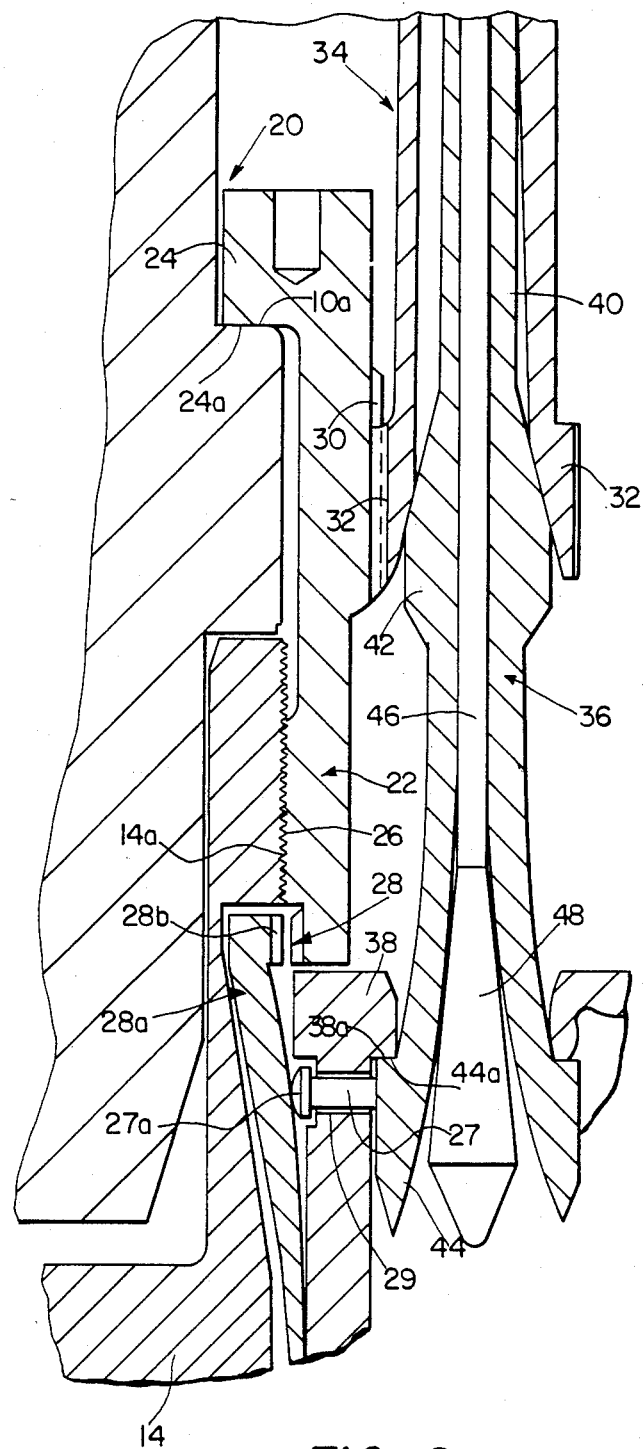
FIG. 2 is a side elevational view, partially in cross section, of the support arrangement of the invention with the installation tool assembly in place.

Referring to FIG. 2, which is a detail of the support arrangement 20 with the installation tool assembly in place, the support arrangement 20 basically comprises a cell support nut 22, which is generally cylindrical in shape and only one half of which is shown in FIG. 2, including an upper flange portion 24 having a downwardly facing bearing surface 24a that engages a corresponding upwardly facing bearing surface 10a of pressure vessel head 10 and a screw threaded portion 26 which engages a corresponding threaded portion 14a of shroud housing 14. A spring loaded spline lock, indicated at 28, prevents nut 22 from loosening during service. Spline lock 28 includes a spring member 28a having a spline 28b located at the free end thereof as illustrated. The head 27a of a bolt 27 located in an aperture 29 in shroud housing 12 is, as explained below, adapted to engage spring member 28a at a point intermediate the ends thereof during installation. The bore of nut 22 is splined at 30 to engage an outwardly projecting portion 32 of a torquing tool 34 described below.

The inner surface of shroud housing 14 is shaped to engage a cell lifting and preloading tool 36 which is also described below and to this end, this surface includes an inwardly projecting gripping flange 38 which defines the inner bore of shroud housing 12. In a specific example, this bore is two inches in diameter.

Figure 3:
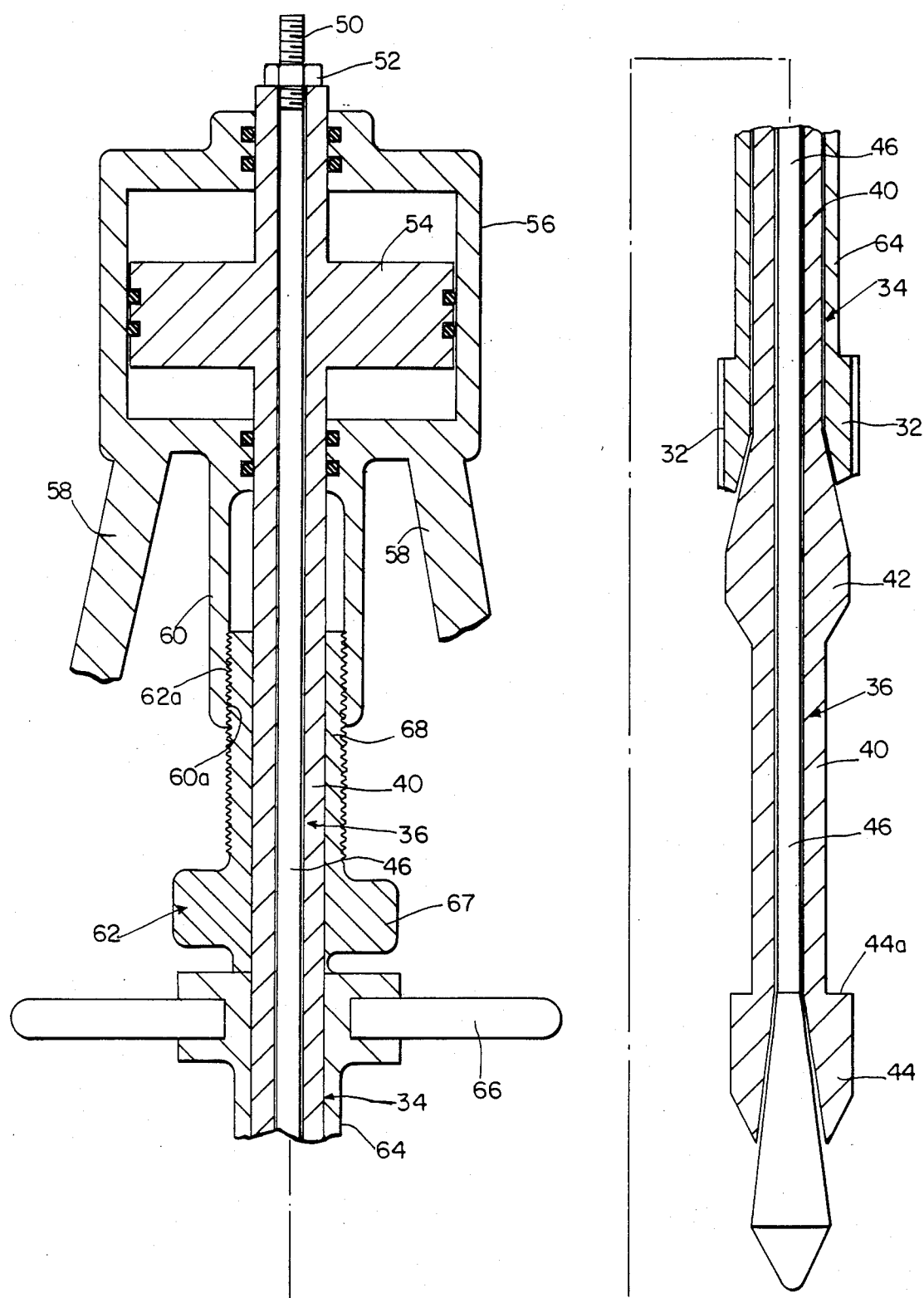
FIG. 3 is a cross sectional view of the tool assembly of FIG. 2.

The module lifting and preloading tool 36 includes an expanding collet assembly including an elongate, cylindrical lifting member 40 which extends parallel to the longitudinal axis of the shroud housing 14. Lifting member 40 includes an intermediate enlarged portion 42 and an enlarged gripping portion 44 at the shroud (lower) end thereof. The lifting member 40 is bifurcated or otherwise split at the shroud end so as to form the expandable gripping arms of the collet assembly. Gripping portion 44 includes a bearing surface 44a which, when the gripping arms of the lifting member 40 are expanded and member 44 is suitably positioned, engages a corresponding bearing surface 38a of flange 38 of shroud housing 12. A central rod 46 is located in a longitudinal bore or opening formed centrally of lifting member 40 and extends along the length of member 40 as shown in FIG. 2 and FIG. 3. A tapered head 48 at the end of rod 46 cooperates with the expandable gripping arms of member 40 to actuate the expanding collet assembly and in particular, to control expansion and contraction of the gripping arms of lifting member 40 depending on the longitudinal position of head 48. The expanded position is shown in FIG. 2 wherein the gripping portions 44 of member 40 are forced outwardly by rod head 48 and engage flange 38 of shroud housing 12. The normal position is shown in FIG. 3.

As illustrated in FIG. 3, the upper end of rod 46, i.e., the end opposite head 48, is threaded as indicated at 50 and a nut 52 controls the longitudinal movement of rod 46.

As is also shown in FIG. 3, lifting member 40 further includes, near the upper end thereof, a piston 54 which cooperates with a hydraulic cylinder 56 to provide preloading. Cylinder 56 is suitably supported by struts indicated at 58 and includes a downwardly depending skirt portion 60 which is threaded at 60a and engages threading 62a of a spacer nut 62. Spacer nut 62 controls movement of torquing tool 34 as is described in more detail below.

Turning now to a consideration of torquing tool 34, this tool comprises an elongate expandable sleeve member 64 which is somewhat similar in construction to lifting member 40 and which carries splines 32 referred to above at the lower, expandable end thereof. A handle 66 for rotating sleeve 64 is located at the upper end thereof. Spacer nut 62, which was referred to above, includes a lower, enlarged nut portion 67 and an upper tubular sleeve portion 68 which, as mentioned above, includes threading 60a. The lower end of spacer nut 60 abuts the upper end of sleeve member 64 and when nut 60a is screwed downwardly, sleeve member 64 of torquing tool 34 is forced downwardly so that the lower end thereof engages the intermediate enlarged portion 42 of lifting member 40 and is expanded thereby as illustrated in FIG. 2, whereby spline portions 32 are brought into engagement with cell support nut 22.

Briefly considering the operation of the module support apparatus described above, assembly of the module support begins with insertion of the installation tool assembly, comprising torquing tool 34 and lifting and preloading tool 36, through the CDM 12. The CDM 12 has a restricted bore (assumed to be 2 inches in diameter in the specific example under consideration) and the installation tool assembly fits through this bore. Next, the cell lifting and preloading tool 36 is expanded into engagement with shroud housing 14, gripping portions 44 of lifting member 40 being expanded into engagement with flange 38 by action of head 48 in response to the upward longitudinal movement of rod 46 as described above. It should be noted that with gripping portions 44 so expanded, bolt 27 will be displaced thereby radially and the head 27a of bolt 27 will contact spring member 28a of spring lock 28 and force spring member 28a out of engagement with cell support nut 22 as shown in FIG. 2. Thus spring lock 28 is disengaged at this point in the operation and support nut 22 can be rotated relative to shroud housing 14.

At this time, the cell is lifted into position and preloaded by actuation of the hydraulic piston 54 whose movement controls the longitudinal position of lifting member 40. At this point the lower end 32 of torquing tool 34 is expanded into engagement with the cell support nut 22, this expansion taking place by virtue of the downward movement of sleeve member 64 and the coaction therewith with the enlarged portion 42 of lifting member 40. The engagement of cell support nut 22 with shroud housing 14, and head 10, is tightened through the use of handle 66. This completes the cell installation.

After the cell installation has been completed the installation tool assembly is removed by retracting the expanded portions and withdrawing the assembly through the bore in CDM 12. With the removal of the installation tool assembly, shroud housing 14 will be supported by cell support nut 22 and the spline lock 28 will be engaged so as to prevent loosening of the threaded connection between nut 22 and housing 14.

The module support nut 22 is constructed so as to be capable of being disengaged through the use of a spanner wrench in the event that jamming occurs and, because of this jamming, the nut 22 cannot be disengaged by normal methods. This use of a spanner wrench requires removal of CDM 12.

It will be appreciated that module support arrangement of the invention possesses a number of advantages compared with a conventional PWR module mounting arrangement. In particular, less structural metal is required in the fuel assembly, thereby resulting in improved neutron economy and higher core power and/or endurance. Further, there is less fuel assembly distortion, which results in freer control rod motion and simpler, more reliable refueling. Further, the module support arrangement of the invention also possesses important advantages over other head-supported core arrangements including the features that the CDMs do not have to be removed to gain access to the module suspension hardware and the head thickness can be greatly reduced because only small head penetrations are required.

Although the invention has been described relative to an exemplary embodiment thereof, it will be understood by those skilled in the art that variations and modifications can be effected in this exemplary embodiment without departing from the scope and spirit of the invention.

I claim:

1. A support arrangement in combination with a nuclear reactor, which comprises at least one fuel cell module, at least one control drive mechanism, and at least one pressure vessel head, wherein said support arrangement is located between said fuel cell module and said control drive mechanism and is supported by said pressure vessel head, said support arrangement comprising:
   a module support nut, engaged with said pressure vessel head and supported therefrom, including a downwardly depending screw threaded portion, and
   a shroud housing for said fuel cell module including a screw threaded portion engaged with said screw threaded portion of said support nut such that said shroud housing is suspended from said support nut and thus from said pressure vessel head,
   said module support nut and said shroud housing including a locking means for locking said nut and housing against relative rotation.

2. A support arrangement as claimed in claim 1 wherein said locking means includes a spring mount spline lock member associated with said shroud housing and a spline lock member associated with said support nut, wherein said spline lock member of said shroud housing is normally biased into engagement with said spline lock member of said support nut.

3. A support arrangement as claimed in claim 1 wherein said module support nut includes a further spline member adapted to engage a torquing tool for applying torque to said support nut.

4. A support arrangement as claimed in claim 1 wherein said shroud member includes a gripping flange adapted to be engaged by a lifting and preloading tool for providing lifting and preloading of said support arrangement.

5. A support and installation arrangement in combination with a nuclear reactor which comprises at least one fuel cell module, at least one control drive mechanism, and at least one pressure vessel head, wherein said support arrangement is located between said fuel cell module and said control drive mechanism and is supported by said pressure vessel head, said support arrangement comprising:
   a module support nut, engaged with said pressure vessel head and supported therefrom, including a downwardly depending screw threaded portion, and
   a shroud housing for the fuel cell module including a screw threaded portion engaged with said screw threaded portion of said support nut such that said shroud housing is suspended from said support nut and thus from said pressure vessel head, and
   an installation tool assembly adapted to be inserted through the bore in the control drive mechanism for said fuel cell module, said assembly including a lifting and preloading tool for engaging and lifting said shroud housing and a concentrically mounted torquing tool for engaging said module support nut and applying torque thereto.

6. A support and installation arrangement as claimed in claim 5 wherein said lifting and preloading tool includes an expandable gripping portion for, when expanded, gripping the shroud housing, and a central rod member for controlling expansion of said expandable gripping portion.

7. A support and installation arrangement as claimed in claim 6 wherein said shroud housing includes an inwardly extending flange with a downwardly facing surface and said gripping portion includes an upwardly facing support surface which, in the use of said lifting and preloading too, is adapted to be engaged by said downwardly facing surface of said flange.

8. A support and installation arrangement as claimed in claim 7 wherein said lifting and preloading tool includes an elongate lifting member which includes said gripping portion, and hydraulic means for controlling longitudinal movement of said lifting member.

9. A support and installation arrangement as claimed in claim 8 wherein said hydraulic means includes a hydraulic piston formed integrally with said lifting member.

10. A support and installation arrangement as claimed in claim 5 wherein said torquing tool includes expandable gripping means for, when expanded, gripping said module support nut and means for applying a torque to said gripping means.

11. A support and installation arrangement as claimed in claim 10 wherein said lifting and preloading tool includes an elongate lifting member positioned concentrically within said expandable gripping means of said torquing tool and including means for expanding said expandable gripping means.

12. A support and installation arrangement as claimed in claim 11 wherein said gripping means comprises an expandable sleeve, said torque applying means comprises a handle connected to the upper end of said sleeve, and wherein said arrangement further includes a spacer nut concentric with said sleeve and in abutment with the upper end thereof.

13. A support and installation arrangement as claimed in claim 12 wherein said means for expanding said expandable gripping means comprises an enlarged portion of said elongate lifting member located intermediate the ends thereof and wherein said module support nut includes an inwardly extending spline portion for engagement by said expandable gripping means.

14. A support and installation arrangement as claimed in claim 13 wherein said module support nut and said shroud housing include spline lock means for locking said support nut and housing against rotation and wherein said gripping portion of said lifting and preloading tool provides disengagement of said spline lock means from said shroud housing.

15. A support and installation arrangement as claimed in claim 14 wherein said spline lock means includes a spring loaded spline locking member and said shroud housing includes a bolt member which is positioned to be engaged by said gripping portion of said lifting and preloading tool and which, when engaged by said gripping portion, contacts said spring loaded spline locking member and causes disengagement thereof from the module support nut.

* * * * *